(12) United States Patent
Shankar

(10) Patent No.: US 7,245,620 B2
(45) Date of Patent: Jul. 17, 2007

(54) METHOD AND APPARATUS FOR FILTERING PACKET DATA IN A NETWORK DEVICE

(75) Inventor: Laxman Shankar, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1049 days.

(21) Appl. No.: 10/268,668

(22) Filed: Oct. 11, 2002

(65) Prior Publication Data

US 2003/0174711 A1   Sep. 18, 2003

Related U.S. Application Data

(60) Provisional application No. 60/364,146, filed on Mar. 15, 2002.

(51) Int. Cl.
*H04L 12/28* (2006.01)
*H04L 12/56* (2006.01)

(52) U.S. Cl. .................. 370/392; 370/389; 709/232; 713/154

(58) Field of Classification Search .............. None
See application file for complete search history.

(56) References Cited

U.S. PATENT DOCUMENTS

| 5,473,607 | A | * | 12/1995 | Hausman et al. ......... 370/392 |
| 5,574,910 | A | | 11/1996 | Bialkowski et al. |
| 5,696,899 | A | | 12/1997 | Kalwitz |
| 5,828,653 | A | | 10/1998 | Goss |
| 5,898,687 | A | | 4/1999 | Harriman et al. |
| 5,951,651 | A | | 9/1999 | Lakshman et al. |
| 6,041,053 | A | | 3/2000 | Douceur et al. |
| 6,289,013 | B1 | | 9/2001 | Lakshman et al. |
| 6,744,783 | B1 | * | 6/2004 | Tzeng ...................... 370/469 |
| 7,093,288 | B1 | * | 8/2006 | Hydrie et al. ................ 726/13 |
| 7,099,336 | B2 | * | 8/2006 | Kalkunte et al. .......... 370/398 |
| 7,103,045 | B2 | * | 9/2006 | Lavigne et al. ............. 370/392 |
| 2002/0176433 | A1 | * | 11/2002 | Zhu et al. ................... 370/422 |
| 2003/0123456 | A1 | * | 7/2003 | Denz et al. ................. 370/400 |
| 2003/0174703 | A1 | * | 9/2003 | Relan ......................... 370/392 |

FOREIGN PATENT DOCUMENTS

| EP | 0312917 | 4/1989 |
| EP | 0465090 | 1/1992 |
| FR | 2741466 | 5/1997 |
| WO | 00/56024 | 9/2000 |

* cited by examiner

*Primary Examiner*—Chirag G. Shah
(74) *Attorney, Agent, or Firm*—Squire, Sanders & Dempsey LLP

(57) ABSTRACT

A process of filtering packet data in a network device is disclosed. At least one mask is applied to a portion of an incoming packet and a field is extracted from the portion of the incoming packet. A rules table is searched for a matching value for the extracted field and one of a hit and a miss is recorded depending on the matching value. A combination table is accessed based on the at least one mask and the one of the hit and the miss is combined with another search result to obtain a combined search result. One of a hit action and a miss action is executed from the combination table based on the combined search result.

20 Claims, 4 Drawing Sheets

METHOD AND APPARATUS FOR FILTERING PACKET DATA IN A NETWORK DEVICE

REFERENCE TO RELATED APPLICATIONS

This application claims priority of U.S. Provisional Patent Application Ser. No. 60/364,146, filed on Mar. 15, 2002. The contents of the provisional application are hereby incorporated by reference.

BACKGROUND OF THE INVENTION

1. Field of Invention

The present invention relates to network devices, including switches, routers and bridges, which allow for data to be routed and moved in computing networks. More specifically, the present invention provides for an improved method of classifying flows of packets through a network device and a network device having such a processor to classify flows.

2. Description of Related Art

Many types of network devices are necessary to allow a network to function properly. One such network device is commonly referred to as a switch. A switch is defined as a network component that receives incoming data, stores the data temporarily, and sends the data back out on another port. The switching is accomplished by determining a destination address from the incoming data and sending the data to a port or set of ports associated with the destination address. The control and monitoring of a switch is essential in handling the flow of data in high speed networks. The effective functioning of the switch can be enhanced by control of the traffic through the switch, including monitoring and modification of that traffic. One such function is the control of the selective flow of data through the switch in response to congestion, either internal or external to the switch. There are many mechanisms that are known and applied to networks to allow for the switch to respond to congestion.

A particular function that allows for network devices to monitor such flows for congestion is filtering of the data that pass through the network devices. Such filtering of packets can be either static or dynamic, and can examine a packet header to determine attributes of the packet, such as its source or destination, or examine other portions of the packet. Some network devices have fast filtering processors that are independent of any central processing unit connected to the network device. Because of the independence of such fast filtering processors, linespeed processing is more easily achieved and the functions of the processor can be tailored to the filtering functions required than could a central processing unit (CPU).

One example of a filtering processor is described in U.S. Pat. No. 6,335,935, which is hereby incorporated by reference. Additionally, these systems are often implemented using large, fixed size masks that are applied to portions of the packets. The application of the masks allows for selected packet fields to be extracted and the processor determines if extracted fields match configured values so that a specific action can be implemented. Additionally, filtering may also include management of flows through the network device and allow for the specific handling of certain data based on fields within the packet. These fields contain data about the source, destination, protocol and other properties of the packet. Classification of flows of incoming packets on an ingress port of a network device is helpful in providing differentiated services to different types of traffic flows.

However, these fast filtering processors require that a significant portion of the network device be utilized in the filtering process. The filtering processes are generally not expandable, and can take a great number of cycles to process and can increase therefore latency periods for address resolution lookup (ARL) and ingress processes. Given that the number of masks that can be applied is generally limited, the number of functions that a fast filtering processor can perform is also limited.

As such, there is a need for an efficient filtering method and apparatus that allows for a greater number of masks to be applied to the data passing through network devices. There is also a need for filtering mechanisms that are more flexible but do not require more a greater amount of space on the network device and do not require significantly greater processing power to carry out.

SUMMARY OF THE INVENTION

It is an object of this invention to overcome the drawbacks of the above-described conventional network devices and methods. The present invention provides for an optimal method of combining rule results from the application of masks to a packet and executing user specified actions. The present invention provides for a method using combinations of masks where the results of each rule match are combined and either an action or a miss action is taken.

According to one aspect of this invention, a process of filtering packet data in a network device is disclosed. At least one mask is applied to a portion of an incoming packet and a field is extracted from the portion of the incoming packet. A rules table is searched for a matching value for the extracted field and one of a hit and a miss is recorded depending on the matching value. A combination table is accessed based on the at least one mask and the one of the hit and the miss is combined with another search result to obtain a combined search result. One of a hit action and a miss action is executed from the combination table based on the combined search result.

Alternatively, multiple hit actions or multiple miss actions may be carried on based on the combined search result. Additionally, the process may be performed for each mask in a table of masks. Also, each mask in the table of masks may have a mask number and the combination table may be indexed by mask number. Also, the portion of the incoming packet obtained may be from a header of the incoming packet. The process may also include receiving the incoming packet on a port interface and parsing the incoming packet to obtain the portion of the incoming packet. In addition, requests may be send to the address resolution lookup engine and the fast filtering processor to initiate the processes for those components.

According to another aspect of this invention, a filter for packet data in a network device is disclosed. The filter includes applying means for applying at least one mask to a portion of an incoming packet and an extracting means for extracting a field from the portion of the incoming packet. The filter also includes searching means for searching a rules table for a matching value for the extracted field and recording means for recording as one of a hit and a miss depending on the matching value. Also, the filter includes accessing means for accessing a combination table based on the at least one mask, combining means for combining the one of the hit and the miss with another search result to obtain a combined search result, and executing means for executing one of a hit action and a miss action from the combination table based on the combined search result.

In another embodiment, network device having a packet filter is disclosed. The network device includes at least one port interface, having at least one port for receiving an incoming packet and a packet parser, in communication with the at least one port interface, where the parser obtains a portion of the incoming packet. The network device includes a field extractor, in communication with the packet parser, where the extractor applies at least one mask to the portion of the incoming packet and extracts at least one field from the portion of the incoming packet and a rules table and a combination table, both in communication with the field extractor. Wherein the field extractor is configured to execute one of a hit action and a miss action obtained from the combination table based on a combined search result.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

Figure 1:
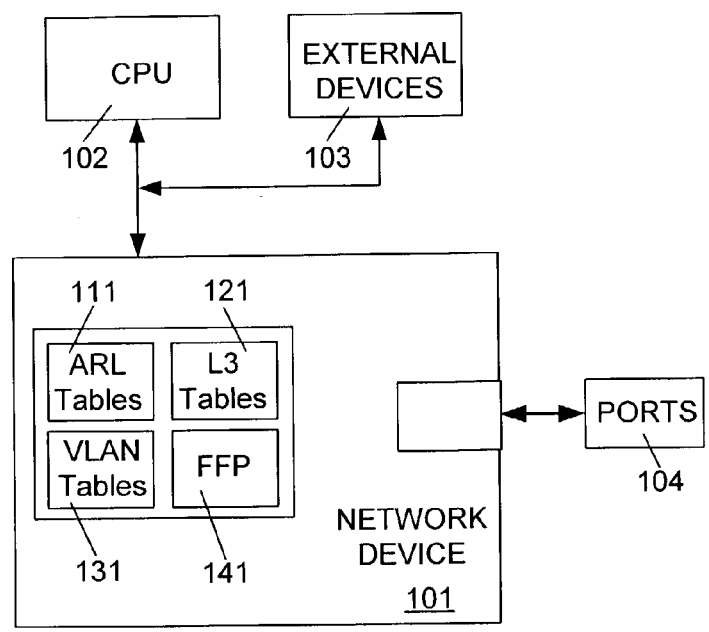
FIG. 1 is a general block diagram of elements of an example of a network device according to one embodiment of the present invention.

FIG. 1 illustrates a configuration of a node of a network, in accordance with the present invention. The network device 101 can be connected to a Central Processing Unit (CPU) 102 and other external devices 103. The CPU can be used as necessary to program the network device 101 with rules that are appropriate to control packet processing. In one embodiment, the network 101 device should be able to process data received through physical ports 104 with only minimal interaction with the CPU and operate, as much as possible, in a free running manner. The network device 101 utilizes tables of data to determine the proper processing and routing of an incoming packet. These lookup tables can include, among others, Address Resolution Logic (ARL) tables 111, Layer 3 (L3) tables 121, and Virtual Local Area Network (VLAN) tables 131. The Fast Filtering Processor (FFP) 141, as discussed above, provides filtering of data packets.

When the packet comes in from the ingress port the decision to accept the frame for learning and forwarding is done based on several ingress rules. The process of learning occurs if information for the packet is not in the lookup table and the table is updated with the packet data. The forwarding process, as discussed above, is one of the essential functions of the network device in that a packet is forwarded toward its destination address by this process. These ingress rules are based on the Protocols and Filtering Mechanisms supported in the switch. The protocols which decide these rules could include, for example, IEEE 802.1d (Spanning Tree Protocol), 802.1p and 802.1q. Extensive Filtering Mechanism with inclusive and exclusive Filters is supported. These Filters are applied on the ingress side, and depending on the filtering result, different actions are taken. Some of the actions may involve changing the 802.1p priority in the packet Tag header, changing the Type Of Service (TOS) Precedence field in the IP Header or changing the egress port.

Figure 2:
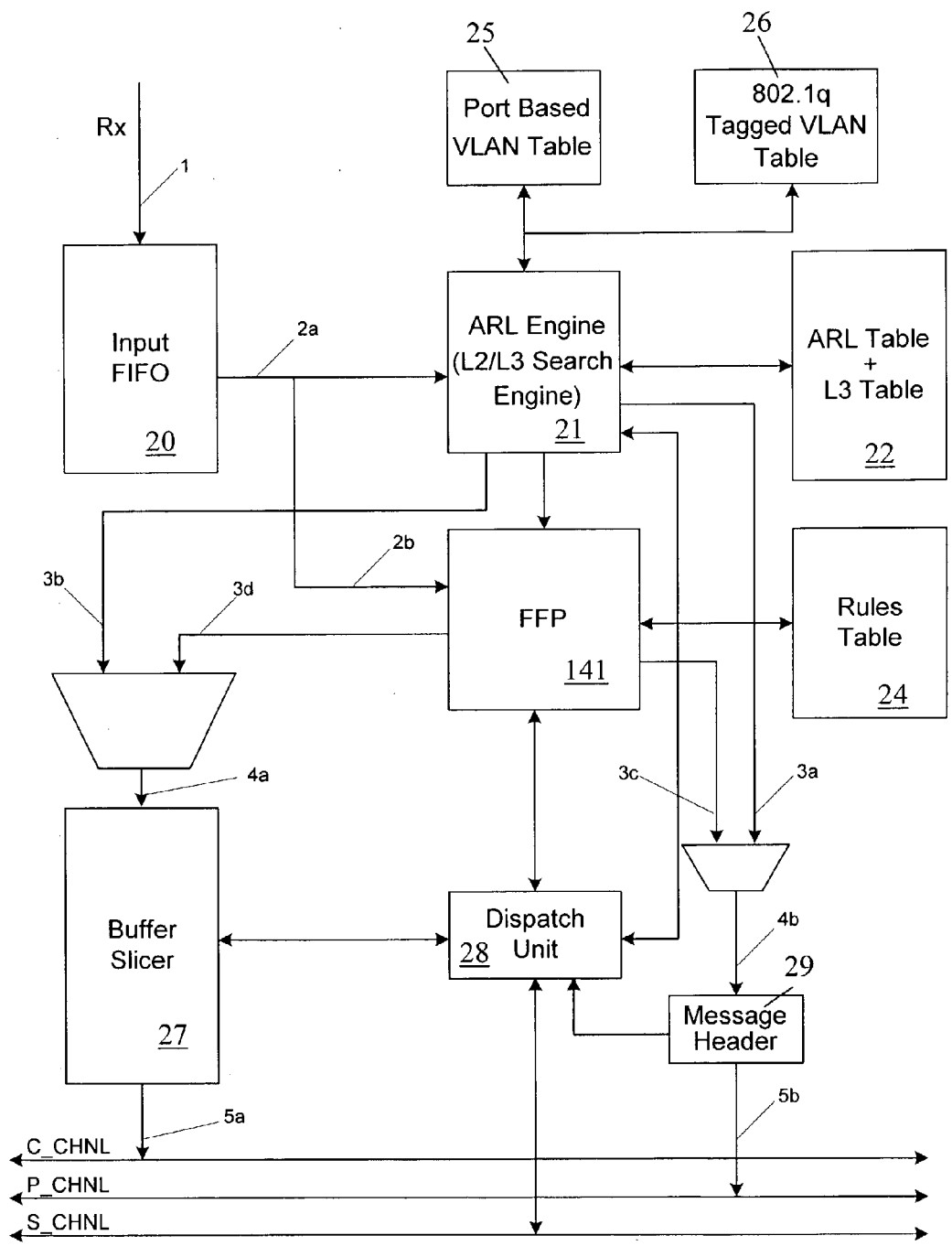
FIG. 2 is a data flow diagram for a packet on ingress to the network device.

The data flow on the ingress into the switch will now be discussed with respect to FIG. 2. As the packet comes in, it is put in the Input FIFO 20, as shown in step 1. An Address Resolution Request is sent to the ARL Engine 21 as soon as the first 16 bytes arrive in the Input FIFO 20 at 2*a*. If the packet has 802.1q Tag then the ARL Engine does the lookup based on 802.1q Tag in the TAG BASED VLAN TABLE 26. If the packet does not contain 802.1q Tag then ARL Engine 21 gets the VLAN based on the ingress port from the PORT BASED VLAN TABLE 25. Once the VLAN ID is identified for the incoming packet, ARL Engine does the ARL Table 22 search based on Source Mac Address and Destination Mac Address. The key used in this search is Mac Address and VLAN ID. If the result of the ARL search is one of the L3 Interface Mac Address, then it does the L3 search to get the Route Entry. If an L3 search is successful then it modifies the packet as per Packet Routing Rules.

At step 2*b*, a Filtering Request is sent to Fast Filtering Processor (FFP) 141 as soon as first 64 bytes arrive in the Input FIFO. The outcome of the ARL search, step 3*a*, is the egress port/ports, the Class Of Service (COS), Untagged Port Bitmap and also in step 3*b* the modified packet in terms of Tag Header, or L3 header and L2 Header as per Routing Rules. The FFP applies all the configured Filters and results are obtained from the ACTION TABLE.

The output of the Filtering Logic, at 3*c*, determines if the packet has to be discarded, sent to the CPU or, in 3*d*, the packet has to be modified in terms of 802.1q header or the TOS Precedence field in the IP Header. If the TOS Precedence field is modified in the IP Header then the IP Checksum needs to be recalculated and modified in the IP Header.

The outcome of FFP and ARL Engine, in 4*a*, is applied to modify the packet in the Buffer Slicer 27. Based on the outcome of ARL Engine and FFP, 4*b*, the Message Header 29 is formed ready to go on the Protocol Channel. The Dispatch Unit 28 sends the modified packet over the cell Channel, in 5*a*, and at the same time, in 5*b*, sends the control Message on the Protocol Channel. The Control Message contains the information such as source port number, COS, Flags, Time Stamp and the bitmap of all the ports on which the packet should go out and Untagged Bitmap.

FFP 141 is essentially a state machine driven programmable rules engine. The filters used by the FFP can be 64 (sixty-four) bytes wide, and are applied on an incoming packet; any offset can be used, however, a preferred embodiment uses an offset of zero, and therefore operates on the first 64 bytes, or 512 bits, of a packet. It is noted that while the 64 byte masks are discussed below, the invention is not limited to masks of any particular width. The actions taken by the filter are tag insertion, priority mapping, TOS tag insertion, sending of the packet to the CPU, dropping of the packet, forwarding of the packet to an egress port, and sending the packet to a mirrored port. The filters utilized by FFP 141 are defined by a rules table. Rules table 24 is completely programmable by CPU 102. The rules table can be, for example, 256 entries deep, and may be partitioned for inclusive and exclusive filters, with, again as an example, 128 entries for inclusive filters and 128 entries for exclusive filters.

A filter database, within FFP 141, includes a number of inclusive mask registers and exclusive mask registers, such that the filters are formed based upon the rules in rules table 24, and the filters therefore essentially form a 64 byte wide mask or bit map which is applied on the incoming packet. If the filter is designated as an exclusive filter, the filter will exclude all packets unless there is a match. In other words, the exclusive filter allows a packet to go through the forwarding process only if there is a filter match. If there is no filter match, the packet is dropped. In an inclusive filter, if there is no match, no action is taken but the packet is not dropped. Action on an exclusive filter requires an exact match of all filter fields. If there is an exact match with an exclusive filter, then, action is taken as specified in the action field. The actions which may be taken are discussed above. If there is no match with the packet and the exclusive filter, then no action is taken and the packet proceeds through the forwarding process.

The FFP configuration, in one embodiment, taking action based upon the first 64 bytes of a packet, enhances the handling of real time traffic since packets can be filtered and action can be taken on the fly. Without an FFP according to the invention, the packet would need to be transferred to the CPU for appropriate action to be interpreted and taken. For inclusive filters, if there is a filter match, action is taken, and if there is no filter match, no action is taken; however, packets are not dropped based on a match or no match situation for inclusive filters.

In summary, the FFP includes a filter database with a set number of inclusive filters and a set number of exclusive filters, as separate filter masks. As a packet comes into the FFP, the filter masks are applied to the packet; in other words, a logical AND operation is performed with the mask and the packet. If there is a match, the matching entries are applied to rules tables 24, in order to determine which specific actions will be taken.

As mentioned previously, the actions include 802.1p tag insertion, 802.1p priority mapping, IP TOS (type-of-service) tag insertion, sending of the packet to the CPU, discarding or dropping of the packet, forwarding the packet to an egress port, and sending the packet to the mirrored port.

As noted previously, exclusive filters are defined in the rules table as filters which exclude packets for which there is no match; excluded packets are dropped. With inclusive filters, however, packets are not dropped in any circumstances. If there is a match, action is taken as discussed above; if there is no match, no action is taken and the packet proceeds through the forwarding process.

Figure 3:
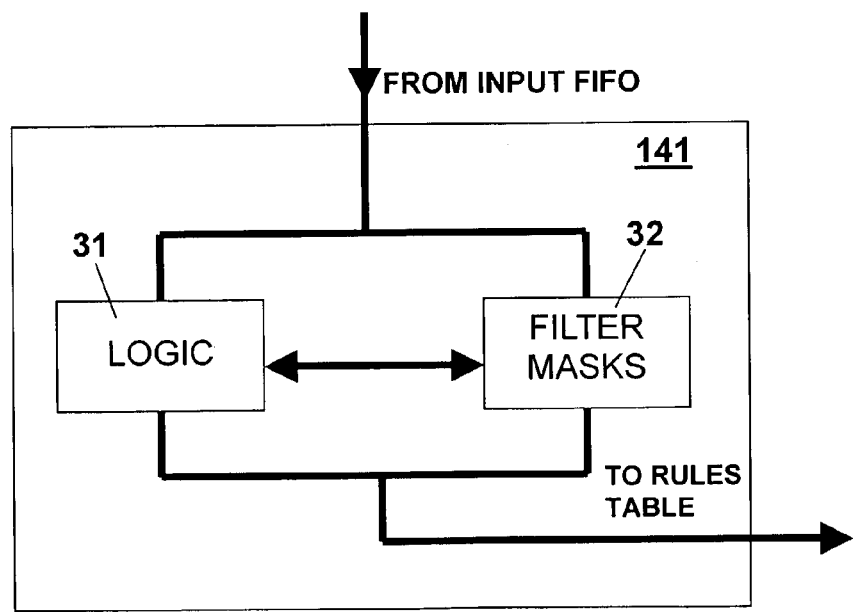
FIG. 3 is a general block diagram of the elements of the fast filtering processor (FFP), according to one embodiment of the invention.

Referring to FIG. 3, FFP 141 is shown to include filter database 32 containing filter masks therein, communicating with logic circuitry 31 for determining packet types and applying appropriate filter masks. After the filter mask is applied as noted above, the result of the application is applied to rules table 24, for appropriate lookup and action. It should be noted that the filter masks, rules tables, and logic, while programmable by CPU 102, do not rely upon CPU 102 for the processing and calculation thereof. After programming, a hardware configuration is provided which enables linespeed filter application and lookup.

Referring once again to FIG. 3, after FFP 141 applies appropriate configured filters and results are obtained from the appropriate rules table 24, logic 31 in FFP 141 determines and takes the appropriate action. The filtering logic can discard the packet, send the packet to the CPU 102, modify the packet header or IP header, and recalculate any IP checksum fields or takes other appropriate action with respect to the headers. The modification occurs at Buffer Slicer 27, and the packet is placed on C channel. The control message and message header information is applied by the FFP 141 and ARL engine 21, and the message header is placed on P channel. Dispatch unit 28 coordinates all dispatches to C channel, P channel and S channel.

Figure 4:
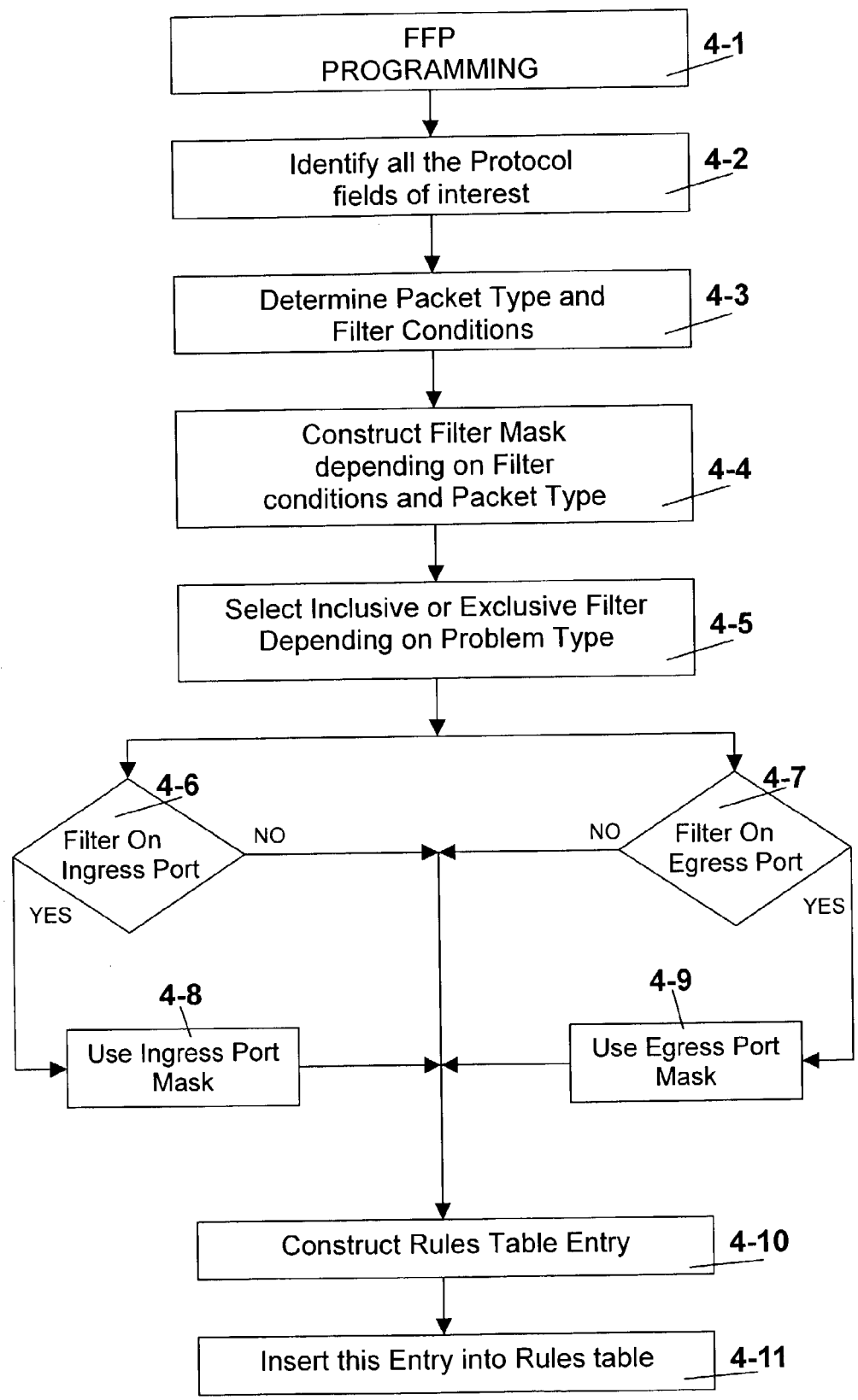
FIG. 4 is a flow chart illustrating the process of programming the FFP.

As mentioned previously, FFP 141 is programmed by the user, through CPU 102, based upon the specific functions which are sought to be handled by each FFP 141. Referring to FIG. 4, it can be seen that in step 4-1, an FFP programming step is initiated by the user. Once programming has been initiated, the user identifies the protocol fields of the packet which are to be of interest for the filter, in step 4-2. In step 4-3, the packet type and filter conditions are determined, and in step 4-4, a filter mask is constructed based upon the identified packet type, and the desired filter conditions. The filter mask is essentially a bit map which is applied or ANDed with selected fields of the packet. After the filter mask is constructed, it is then determined whether the filter will be an inclusive or exclusive filter, depending upon the problems which are sought to be solved, the packets which are sought to be forwarded, actions sought to be taken, etc. In step 4-6, it is determined whether or not the filter is on the ingress port, and in step 4-7, it is determined whether or not the filter is on the egress port. If the filter is on the ingress port, an ingress port mask is used in step 4-8. If it is determined that the filter will be on the egress port, then an egress mask is used in step 4-9. Based upon these steps, a rules table entry for rules tables 24 is then constructed, and the entry or entries are placed into the appropriate rules table (steps 4-10 and 4-11). These steps are taken through the user inputting particular sets of rules and information into CPU 102 by an appropriate input device, and CPU 102 taking the appropriate action with respect to creating the filters, through appropriate ingress or egress.

Classification of flows of incoming packets on an ingress port of a network device is critical to providing differentiated services to different types of traffic flows. The FFP can be used in these network devices to classify flows and execute specific actions on each flow identified. The FFP is implemented, in many embodiments, using fixed size masks to execute fields from a packet header and match configured values, resulting in actions. According to the present invention, a combination of two of FFP masks are created where the results of each rule match are combined and user specified actions or miss actions are taken.

In addition to the tables discussed above, the following table is also stored along with each FFP block:

TABLE 1

| {FSEL1, FSEL2} | Action (2-bit) | Miss Action (2-bit) |
|---|---|---|
| (5-bit, 5-bit) | 00: Execute action of FSEL1 hit | 00: Execute miss action of FSEL1 |
| | 01: Execute action of FSEL2 hit | 01: Execute miss action of FSEL2 |
| | 10: Execute action of FSEL1 and FSEL2 hits | 10: Execute both miss actions |
| | 11: Reserved | 11: Reserved |
| {12, 5} | 10 | 00 |
| {3, 9} | 00 | 10 |

Each row in the above table represents a combination rule. There can be a maximum of $$_nC_2 = \frac{n!}{m!((n-m)!}$$

combinations of masks, where n is the number of masks in the FFP.

With respect to mask combinations from the table, the first column is used to combine the results of the rule searches of the FFP. Each FFP mask is used to extract fields from the packet header and search the rules table for a matching value. The result of this operation is a hit or a miss. The two fields shown in the first column are used to decode the mask numbers whose search results are to be combined.

Each filter search results in a Hit (1) or a Miss (0). The search results of the two filters specified in the first column are logically ANDed to result in a 0 or a 1. If the result is a 1, the action specified in the action column is executed. The following are different types of action if both the filters searches have hits: 00 connotes executing the action of filter FSEL1, 01 connotes executing the action of filter FSEL2, 10 connotes: executing the action of filter FSEL1 and FSEL2 and 11 is reserved.

Similarly for miss actions, if the result of the AND operation on the FSEL rule matches equals 0, the miss action specified in the third column is executed. The following are the different types of actions if at least one of the filters searches has a miss: 00 connotes executing the miss action of filter FSEL1, 01 connotes executing the miss action of filter FSEL2, 10 connotes executing the miss action of filter FSEL1 and FSEL2, and 11 is reserved.

The filtering method to be used with an FFP or other filtering device, is a rule combination mechanism as described above. The present invention allows a result of a pair of FFP rule matches to be examined and user specified actions to be executed. The present invention implicitly doubles the size of each FFP mask to permit creation of 64 byte matching rules.

Figure 5:
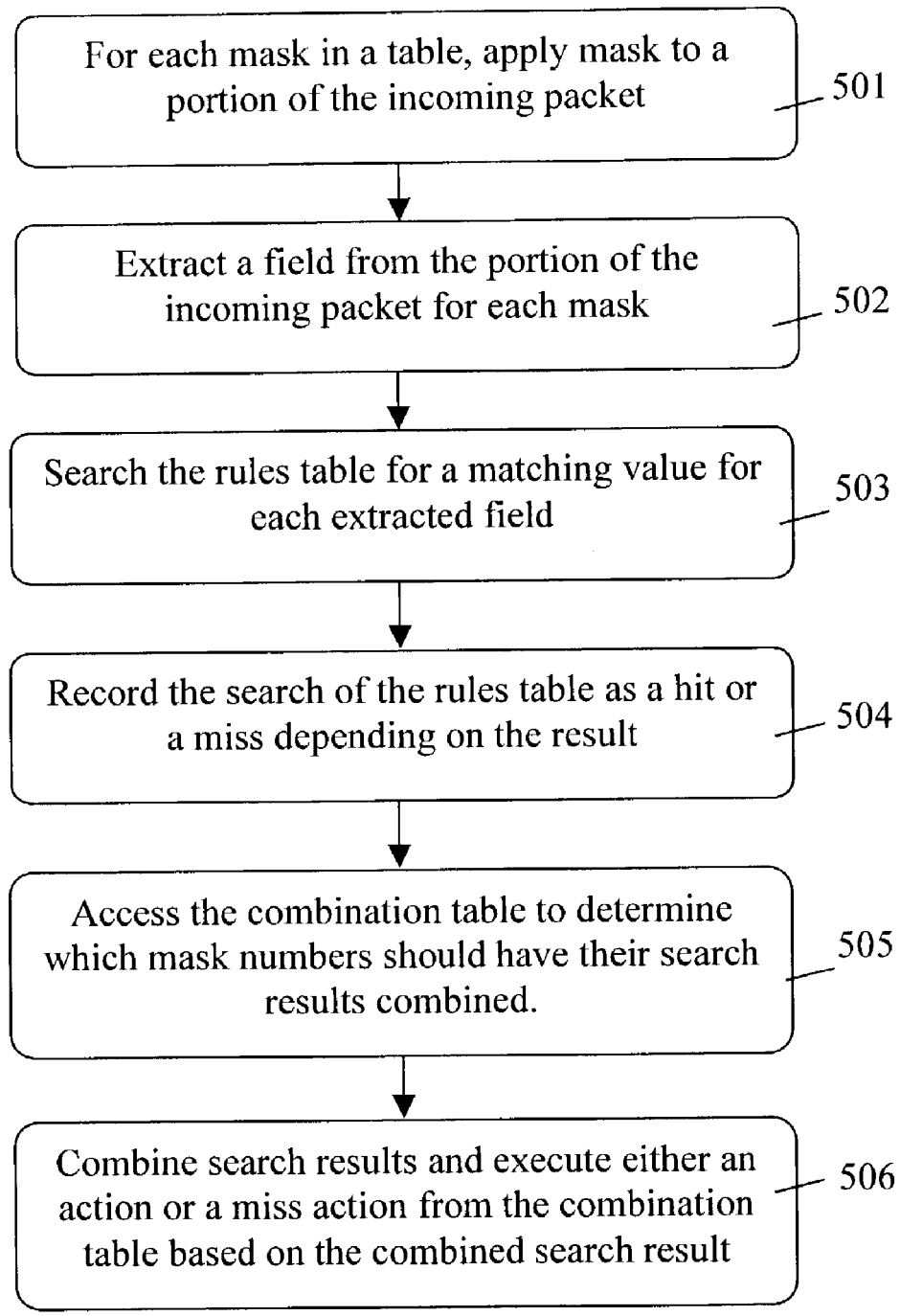
FIG. 5 is a flow chart illustrating the processes carried out by the parser, according to one embodiment of the present invention.

The general processes carried out by the filtering mechanism are illustrated in FIG. 5. In step 501, for each mask in a table, the masks are applied to a portion of the incoming packet. A field is extracted from the portion of the incoming packet for each mask, as in step 502, and the rules table is searched for a matching value for the extracted fields, in step 503. Each search is recorded as a hit or a miss, step 504, and the combination table is accessed to determine which mask numbers should have their search results combined, as in step 505. The search results are combined and one of the action or the miss action, from the combination table, is executed based on the combined search result.

The present invention provides for an optimal, flexible mechanism for parsing and filtering a packet. The present invention detects flows using multiple fields extracted from the packet header. Based on the value of the first extracted field, the second field may be defined and extracted. The action corresponding to the value of the second field is executed. Action can be chained so that multiple fields are extracted and examined before an action programmed in the Action table is executed. The widths of fields extracted can be small resulting in savings in die size.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

In addition, while the term packet has been used in the description of the present invention, the invention has import to many types of network data. For purposes of this invention, the term packet includes packet, cell, frame, datagram, bridge protocol data unit packet, and packet data.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A process of filtering packet data in a network device, said process comprising:
    applying at least one mask to a portion of an incoming packet;
    extracting a field from the portion of the incoming packet;
    searching a rules table for a matching value for the extracted field;
    recording a search result as one of a hit and a miss depending on the matching value;
    accessing a combination table of combination rules based on the at least one mask;
    combining said one of the hit and the miss with another search result to obtain a combined search result; and
    executing one of a hit action and a miss action from the combination table based on the combined search result.

2. A process as recited in claim 1, wherein said step of executing one of an action or a miss action comprises executing one of multiple hit actions and multiple miss actions based on the combined search result.

3. A process as recited in claim 1, wherein said process is performed for each mask in a table of masks.

4. A process as recited in claim 3, wherein each mask in the table of masks has a mask number and said step of accessing a combination table based on the at least one mask comprises accessing a combination table indexed by mask numbers with search results to be combined.

5. A process as recited in claim 1, wherein said step of applying at least one mask to a portion of an incoming packet comprises applying at least one mask to a portion of a header of the incoming packet.

6. A process as recited in claim 1, further comprising:
    receiving said incoming packet on a port interface; and
    parsing said incoming packet to obtain said portion of said incoming packet.

7. A process as recited in claim 6, further comprising, after said step of parsing said incoming packet:
    sending an address resolution lookup request to an address resolution lookup engine; and
    sending a fast filtering processor request to a fast filtering processor.

8. A filter for packet data in a network device, said filter comprising:
    applying means for applying at least one mask to a portion of an incoming packet;

extracting means for extracting a field from the portion of the incoming packet;

searching means for searching a rules table for a matching value for the extracted field;

recording means for recording a search result as one of a hit and a miss depending on the matching value;

accessing means for accessing a combination table of combination rules based on the at least one mask;

combining means for combining said one of the hit and the miss with another search result to obtain a combined search result; and executing means for executing one of a hit action and a miss action from the combination table based on the combined search result.

9. A filter as recited in claim 8, wherein said executing means comprises executing means for executing one of multiple hit actions and multiple miss actions based on the combined search result.

10. A filter as recited in claim 8, wherein said applying means is configured to apply each mask in a table of masks to said portion of the incoming packet.

11. A filter as recited in claim 10, wherein each mask in the table of masks has a mask number and said accessing means comprises accessing means for accessing a combination table indexed by mask numbers with search results to be combined.

12. A filter as recited in claim 8, wherein said applying means comprises applying means for applying at least one mask to a portion of a header of the incoming packet.

13. A filter as recited in claim 8, further comprising:
receiving means for receiving said incoming packet on a port interface; and
parsing means for parsing said incoming packet to obtain said portion of said incoming packet.

14. A filter as recited in claim 13, further comprising:
first sending means for sending an address resolution lookup request to an address resolution lookup engine; and
second sending means for sending a fast filtering processor request to a fast filtering processor.

15. A network device having a packet filter, said network device comprising:
at least one port interface, having at least one port for receiving an incoming packet;
a packet parser, in communication with said at least one port interface, where said parser obtains a portion of said incoming packet;
a field extractor, in communication with said packet parser, where said extractor applies at least one mask to said portion of said incoming packet and extracts at least one field from the portion of the incoming packet;
a rules table, in communication with the field extractor; and
a combination table of combination rules, in communication with the field extractor;
wherein said field extractor is configured to execute one of a hit action and a miss action obtained from the combination table based on a combined search result.

16. A network device as recited in claim 15, wherein said field extractor is configured to execute one of multiple hit actions and multiple miss actions based on the combined search result.

17. A network device as recited in claim 15, wherein said field extractor is configured to apply each mask in a table of masks to said portion of the incoming packet.

18. A network device as recited in claim 17, wherein each mask in the table of masks has a mask number and said combination table is indexed by mask numbers with search results to be combined.

19. A network device as recited in claim 15, wherein said packet parser is configured to obtain said portion from a header of the incoming packet.

20. A network device as recited in claim 15, wherein said packet parser is configured to send an address resolution lookup request to an address resolution lookup engine and configured to send a fast filtering processor request to a fast filtering processor.

* * * * *